United States Patent
Tai et al.

(10) Patent No.: US 11,815,751 B2
(45) Date of Patent: *Nov. 14, 2023

(54) COMPOSITE SUBSTRATE FOR ELECTRO-OPTIC ELEMENT AND METHOD FOR MANUFACTURING THE SAME

(71) Applicant: NGK INSULATORS, LTD., Nagoya (JP)

(72) Inventors: Tomoyoshi Tai, Inazawa (JP); Jungo Kondo, Miyoshi (JP)

(73) Assignee: NGK INSULATORS, LTD., Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/060,289

(22) Filed: Nov. 30, 2022

(65) Prior Publication Data

US 2023/0118353 A1 Apr. 20, 2023

Related U.S. Application Data

(60) Continuation of application No. 17/459,411, filed on Aug. 27, 2021, now Pat. No. 11,573,435, which is a
(Continued)

(51) Int. Cl.
*G02F 1/035* (2006.01)
*G02B 6/13* (2006.01)

(52) U.S. Cl.
CPC ............. *G02F 1/035* (2013.01); *G02B 6/13* (2013.01)

(58) Field of Classification Search
CPC .................................. G02F 1/035; G02B 6/13
See application file for complete search history.

(56) References Cited

U.S. PATENT DOCUMENTS

| | | |
|---|---|---|
| 5,373,579 A | 12/1994 | Eda |
| 5,418,883 A | 5/1995 | Eda |

(Continued)

FOREIGN PATENT DOCUMENTS

| | | |
|---|---|---|
| CN | 103999366 A | 8/2014 |
| JP | 6289346 A | 10/1994 |

(Continued)

OTHER PUBLICATIONS

Written Opinion of International Searching Authority, with English translation, issued in corresponding International Application No. PCT/JP2018/019657 dated Jul. 31, 2018 (13 pages).

(Continued)

*Primary Examiner* — Tina M Wong
(74) *Attorney, Agent, or Firm* — FLYNN THIEL, P.C.

(57) ABSTRACT

A composite substrate for an electro-optic element includes: an electro-optic crystal substrate having an electro-optic effect; a support substrate bonded to the electro-optic crystal substrate at least via an amorphous layer; and a low-refractive-index layer located between the electro-optic crystal substrate and the amorphous layer and having a lower refractive index than the electro-optical crystal substrate. The amorphous layer is constituted of one or more elements that constitute a layer or a substrate contacting the amorphous layer from one side and one or more elements that constitute a layer or a substrate contacting the amorphous layer from another side.

22 Claims, 14 Drawing Sheets

Related U.S. Application Data division of application No. 16/950,306, filed on Nov. 17, 2020, now Pat. No. 11,281,032, which is a continuation of application No. PCT/JP2018/019657, filed on May 22, 2018.

(56) References Cited

U.S. PATENT DOCUMENTS

| 5,546,494 A | 8/1996 | Eda |
|---|---|---|
| 11,281,032 B2 | 3/2022 | Tai et al. |
| 11,573,435 B2 * | 2/2023 | Tai .................... G02F 1/03 |
| 2003/0044100 A1 | 3/2003 | Kondo et al. |
| 2003/0223722 A1 | 12/2003 | Sugita et al. |
| 2007/0297732 A1 | 12/2007 | Mason et al. |
| 2008/0037944 A1 | 2/2008 | Sugita et al. |
| 2010/0232736 A1 | 9/2010 | Ichikawa et al. |
| 2014/0210316 A1 | 7/2014 | Hori et al. |
| 2014/0210317 A1 | 7/2014 | Tai et al. |
| 2015/0098672 A1 | 4/2015 | Yamaguchi et al. |
| 2018/0123309 A1 | 5/2018 | Taira et al. |
| 2019/0154811 A1 | 5/2019 | Kondo et al. |
| 2019/0207585 A1 | 7/2019 | Nomoto et al. |

FOREIGN PATENT DOCUMENTS

| JP | 2003156723 A | 5/2003 |
|---|---|---|
| JP | 2004145261 A | 5/2004 |
| JP | 2006349778 A | 12/2006 |
| JP | 201085789 A | 4/2010 |
| JP | 201278375 A | 4/2012 |
| JP | 201575568 A | 4/2015 |
| JP | 201873984 A | 5/2018 |
| WO | 2007114367 A1 | 10/2007 |
| WO | 2014077213 A1 | 5/2014 |
| WO | 2018008183 A1 | 1/2018 |
| WO | 2018056210 A1 | 3/2018 |

OTHER PUBLICATIONS

International Search Report, with English translation, issued in corresponding International Application No. PCT/JP2018/019657 dated Jul. 31, 2018 (5 pages).

European Search Report issued in corresponding European Application No. 18920077.7, with English translation of category of cited documents, dated Jun. 11, 2021 (9 pages).

Chinese Office Action, with English translation, issued in corresponding Chinese Application No. 201880093270.8 dated Jun. 11, 2021 (18 pages).

Japanese Office Action, with English translation, issued in corresponding Japanese Application No. 2020-006927 dated Nov. 30, 2021 (10 pages).

Notice of Reasons for Refusal with English translation issued in corresponding Japanese Application No. 2022-104444 dated Mar. 22, 2023 (7 pages).

* cited by examiner

COMPOSITE SUBSTRATE FOR ELECTRO-OPTIC ELEMENT AND METHOD FOR MANUFACTURING THE SAME

CROSS-REFERENCE TO RELATED APPLICATION

This is a continuation of U.S. Ser. No. 17/459,411, filed Aug. 27, 2021, which is a divisional of U.S. Ser. No. 16/950,306, filed Nov. 17, 2020, which issued as U.S. Pat. No. 11,281,032 on Mar. 22, 2022, which is a continuation of PCT/JP2018/019657, filed on May 22, 2018, the entire contents of which are hereby incorporated by reference.

TECHNICAL FIELD

The art disclosed herein relates to a composite substrate for an electro-optic element (such as an optical modulator) that uses an electro-optic effect.

BACKGROUND

An electro-optic element such as an optical modulator is known. The electro-optic element is configured to use an electro-optic effect to convert an electric signal to an optical signal. Electro-optic elements are employed in radio-over-fiber technologies, for example, and development thereof is in progress to realize fast and large-capacity communication.

Japanese Patent Application Publication No. 2010-85789 describes an optical modulator. This optical modulator is configured by using a composite substrate. The composite substrate includes an electro-optic crystal substrate having an electro-optic effect and a support substrate bonded to the electro-optic crystal substrate.

SUMMARY

In a conventional composite substrate, an electro-optic crystal substrate and a support substrate are bonded by an adhesive. With such a configuration, the adhesive may degrade over time, as a result of which, a separation may occur in the composite substrate, and damages such as a crack may occur in the electro-optic crystal substrate due to this separation. To avoid such issues, the electro-optic crystal substrate may be directly bonded to the support substrate without using the adhesive. However, when the electro-optic crystal substrate and the support substrate are directly bonded, an amorphous layer constituted of elements of the electro-optic crystal substrate and elements of the support substrate is formed between the electro-optic crystal substrate and the support substrate. This amorphous layer does not have a crystallinity, its optical property differs from those of the substrates on its both sides, and an interface between the electro-optic crystal substrate and the amorphous layer is not flat. Such a non-flat interface has a risk of diffusing (such as diffused reflection or leakage) and absorbing light transmitted through the electro-optic crystal substrate.

Thus, the disclosure herein provides a composite substrate which may avoid or reduce the aforementioned issues, and a method of manufacturing the same.

The disclosure herein discloses a composite substrate for an electro-optic element. This composite substrate comprises: an electro-optic crystal substrate having an electro-optic effect; a support substrate bonded to the electro-optic crystal substrate at least via an amorphous layer; and a low-refractive-index layer located between the electro-optic crystal substrate and the amorphous layer and having a lower refractive index than the electro-optical crystal substrate. The amorphous layer is constituted of one or more elements that constitute a layer or a substrate contacting the amorphous layer from one side and one or more elements that constitute a layer or a substrate contacting the amorphous layer from another side.

The aforementioned composite substrate can be manufactured by a manufacturing method as follows. This manufacturing method comprises: depositing at least one layer comprising a low-refractive-index layer on an electro-optic crystal substrate having an electro-optic effect, the low-refractive-index layer having a lower refractive index than the electro-optic crystal substrate; and directly bonding the electro-optic crystal substrate on which the at least one layer is deposited to a surface of a support substrate. The wording "directly bonding" referred herein means bonding in which atoms diffuse between two members that are bonded and a covalent bond is formed between those atoms. Prior to the direct bonding, at least one layer may be deposited on the surface of the support substrate.

According to the aforementioned manufacturing method, the composite substrate in which the support substrate is bonded to the electro-optic crystal substrate can be manufactured without using an adhesive. The amorphous layer resulting from the direct bonding is formed in the manufactured composite substrate, however, the low-refractive-index layer is interposed between the amorphous layer and the electro-optic crystal substrate, as a result of which, the amorphous layer is not in contact with the electro-optic crystal substrate. As such, light transmitted through the electro-optic crystal substrate is not diffused nor absorbed by the amorphous layer or at a non-flat interface between the amorphous layer and the electro-optic crystal substrate. In addition, the low-refractive-index layer that is in contact with the electro-optic crystal substrate has a lower refractive index than the electro-optic crystal substrate, thus, similar to a cladding in an optical fiber, the low-refractive-index layer can suppress the leakage of the light transmitted through the electro-optic crystal substrate. By using this composite substrate, an electro-optic element with a high performance and durability can be manufactured.

DETAILED DESCRIPTION

Figure 1:
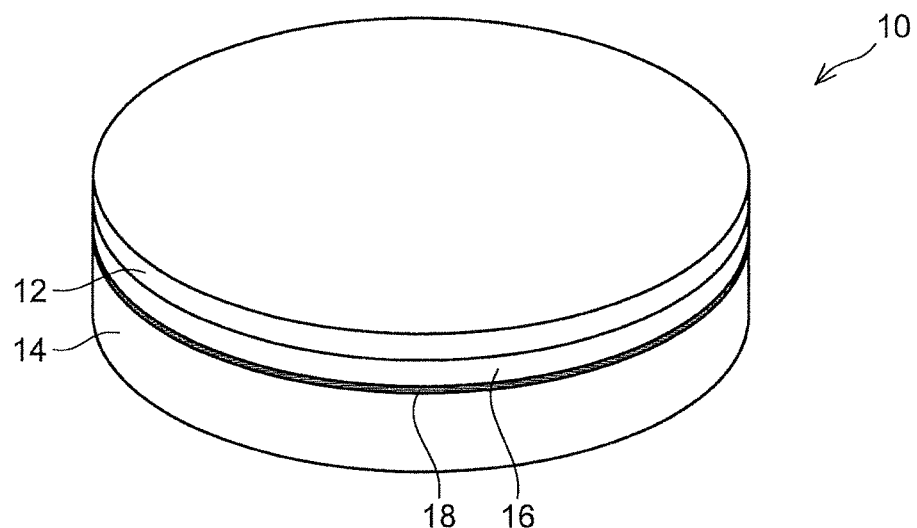
FIG. 1 is a perspective view schematically showing a composite substrate 10 of a first embodiment.

In an embodiment of the disclosure herein, an electro-optic crystal substrate may be a substrate of lithium niobate ($LiNbO_3$: LN), lithium tantalate ($LiTaO_3$: LT), potassium titanyl phosphate ($KTiOPO_4$: KTP), potassium lithium niobate ($K_xLi_{(1-x)}NbO_2$: KLN), potassium niobate ($KNbO_3$: KN), potassium tantalate niobate ($KNb_xTa_{(1-x)}O_3$: KTN), or a solid solution of lithium niobate and lithium tantalite.

In an embodiment of the disclosure herein, the low-refractive-index layer may be constituted of at least one selected from a group consisting of silicon oxide ($SiO_2$), tantalum oxide ($Ta_2O_5$), aluminum oxide ($Al_2O_3$), magnesium fluoride ($MgF_2$), and calcium fluoride ($CaF_2$).

In an embodiment of the disclosure herein, the support substrate may be a substrate of silicon (Si), glass, sialon ($Si_3N_4$—$Al_2O_3$), mullite ($3Al_2O_3 \cdot 2SiO_2$, $2Al_2O_3 \cdot SiO_2$), aluminum nitride (AlN), silicon nitride ($Si_3N_4$), magnesium oxide (MgO), sapphire, quartz, crystal, gallium nitride (GaN), silicon carbide (SiC), or gallium oxide ($Ga_2O_3$).

In an embodiment of the disclosure herein, the layer or substrate contacting the amorphous layer from the one side may be the low-refractive-index layer. Such a composite substrate can be manufactured by directly bonding the electro-optic crystal substrate on which the low-refractive-index layer is deposited to the support substrate. In this configuration, at least one layer may be deposited on the surface of the support substrate in advance.

In an embodiment of the art disclosed herein, the composite substrate may further comprise a first conductive layer located between the low-refractive-index layer and the amorphous layer. In this case, the layer or substrate contacting the amorphous layer from the one side may be the first conductive layer. Such a composite substrate can be manufactured by directly bonding the electro-optic crystal substrate on which the first conductive layer is deposited on the low-refractive-index layer to the support substrate. In this configuration, at least one layer may be deposited on the surface of the support substrate in advance. In the electro-optic element manufactured from the composite substrate, the first conductive layer may be used as an electrode for applying an electric signal (that is, an electric field) to the electro-optic crystal substrate. Alternatively, the first conductive layer may be used as a shield for suppressing the electric field from leaking from the electro-optic element.

The first conductive layer may comprise a layer of gold (Au), silver (Ag), copper (Cu), aluminum (Al), platinum (Pt), or an alloy containing at least two of the aforementioned elements. The first conductive layer may have a single layer structure or a multiple layer structure.

A surface layer of the first conductive layer contacting the amorphous layer may be constituted of platinum. Platinum is a material suitable for direct bonding. Due to this, when the surface layer of the first conductive layer is constituted of platinum, the electro-optic crystal substrate on which the first conductive layer is deposited can suitably be bonded directly to the support substrate.

In the aforementioned embodiment, the composite substrate may further comprise a first bonding layer located between the low-refractive-index layer and the amorphous layer. In this case, the layer or substrate contacting the amorphous layer from the one side may be the first bonding layer. A material constituting the first bonding layer may be, but not particularly limited to, a material suitable for direct bonding, such as tantalum oxide ($Ta_2O_5$), niobium oxide ($Nb_2O_5$), silicon (Si), aluminum oxide ($Al_2O_3$), and titanium oxide ($TiO_2$), for example.

In the aforementioned embodiment, the composite substrate may further comprise a first conductive layer located between the low-refractive-index layer and the first bonding layer. In the electro-optic element manufactured from the composite substrate, the first conductive layer may be used as an electrode for applying an electric signal (that is, an electric field) to the electro-optic crystal substrate. Alternatively, the first conductive layer may be used as a shield for suppressing the electric field from leaking from the electro-optic element.

In an embodiment of the disclosure herein, the layer or substrate contacting the amorphous layer from the other side may be the support substrate. Such a composite substrate can be manufactured by directly bonding the electro-optic crystal substrate to the surface of the support substrate. In this configuration, the first conductive layer and/or the first bonding layer may be arranged in addition to the low-refractive-index layer on the electro-optic crystal substrate.

In an embodiment of the disclosure herein, the composite substrate may further comprise a second bonding layer located between the amorphous layer and the support substrate. In this case, the layer or substrate contacting the amorphous layer from the other side may be the second bonding layer. A material constituting the second bonding layer may be, but not particularly limited to, a material suitable for direct bonding, such as tantalum oxide ($Ta_2O_5$), niobium oxide ($Nb_2O_5$), silicon (Si), aluminum oxide ($Al_2O_3$), and titanium oxide ($TiO_2$), for example.

In the aforementioned embodiment, the composite substrate may further comprise a second low-refractive-index layer located between the second bonding layer and the support substrate and having a lower refractive index than the electro-optic crystal substrate. Generally, the refractive index is proportional to a square root of the dielectric constant, thus the second low-refractive-index layer has a low dielectric constant. As such, when the composite substrate has the second low-refractive-index layer, it becomes easy to satisfy a speed matching condition and adjust a characteristic impedance in the electro-optic element manufactured from the composite substrate. Further, since stray capacitance and dielectric losses can be reduced, fast-speed operation and voltage reduction of the electro-optic element are enabled.

In the aforementioned embodiment, the composite substrate may further comprise a second conductive layer located between the second low-refractive-index layer and the support substrate. In the electro-optic element manufactured from the composite substrate, the second conductive layer may be used as an electrode for applying an electric signal (that is, an electric field) to the electro-optic crystal substrate. Alternatively, the second conductive layer may be used as a shield for suppressing the electric field from leaking from the electro-optic element.

In an embodiment of the disclosure herein, the composite substrate may further comprise a second conductive layer located between the amorphous layer and the support substrate. In this case, the layer or substrate contacting the amorphous layer from the other side may be the second conductive layer. Such a composite substrate can be manufactured by directly bonding the electro-optic crystal substrate on which the second conductive layer is deposited to the support substrate. In the electro-optic element manufactured from the composite substrate, the second conductive layer may be used as an electrode for applying an electric signal (that is, an electric field) to the electro-optic crystal substrate. Alternatively, the second conductive layer may be used as a shield for suppressing the electric field from leaking from the electro-optic element.

The second conductive layer may comprise a layer of gold (Au), silver (Ag), copper (Cu), aluminum (Al), platinum (Pt), or an alloy containing at least two of the aforementioned elements. The second conductive layer may have a single layer structure or a multiple layer structure.

A surface layer of the second conductive layer contacting the amorphous layer may be constituted of platinum. Platinum is a material suitable for direct bonding. Due to this, when the surface layer of the second conductive layer is constituted of platinum, the support substrate on which the second conductive layer is deposited can suitably be bonded directly to the electro-optic crystal substrate.

In an embodiment of the disclosure herein, the composite substrate may further comprise a second low-refractive-index layer located between the amorphous layer and the support substrate and having a lower refractive index than the electro-optic crystal substrate. In this case, the layer or substrate contacting the amorphous layer from the other side may be the second low-refractive-index layer. As aforementioned, since the refractive index is proportional to the square root of the dielectric constant, the second low-refractive-index layer has a low dielectric constant. As such, when the composite substrate has the second low-refractive-index layer, the dielectric loss is reduced in the electro-optic element manufactured from the composite substrate.

In the aforementioned embodiment, the composite substrate may further comprise a second conductive layer located between the second low-refractive-index layer and the support substrate. In the electro-optic element manufactured from the composite substrate, the second conductive layer may be used as an electrode for applying an electric signal (that is, an electric field) to the electro-optic crystal substrate. Alternatively, the second conductive layer may be used as a shield for suppressing the electric field from leaking from the electro-optic element.

In an embodiment of the disclosure herein, a ridge portion may be defined on a surface of the electro-optic crystal substrate. When the ridge portion is defined in advance on the composite substrate, the electro-optic element requiring a ridge type light waveguide can easily be manufactured. In addition to or as an alternative to the ridge portion, the electro-optic crystal substrate may comprise an optical waveguide region doped with impurities (such as titanium or zinc). The optical waveguide region doped with impurities exhibits a small increase in the refractive index due to the doped impurities, by which an optical confinement effect thereof is small, and an optical near field pattern (near field diameter) becomes relatively large. As a result, an electric field efficiency decreases in the electro-optic element manufactured from the composite substrate, and a required driving voltage becomes larger. Due to this, an element size also becomes larger. From aspects of driving voltage reduction and size reduction, a ridge type optical waveguide with a large optical confinement effect is preferable.

In the aforementioned embodiment, a c-axis (that is, a crystallographic axis) of the electro-optic crystal substrate may be parallel to the electro-optical crystal substrate. That is, the electro-optic crystal substrate may be an x-cut or y-cut substrate. In this case, the composite substrate may further comprise a first electrode located on one side surface of the ridge portion and a second electrode located on another side surface of the ridge portion and opposing the first electrode across the ridge portion. These first and second electrodes may be used as electrodes for applying an electric signal (that is, an electric field) to the ridge type optical waveguide upon manufacturing the electro-optic element from the composite substrate.

Alternatively, the c-axis (that is, the crystallographic axis) of the electro-optic crystal substrate may be perpendicular to the electro-optic crystal substrate. That is, the electro-optic crystal substrate may be a z-cut substrate. In this case, the composite substrate may further comprise a first electrode located on a top surface of the ridge portion and a second electrode located in a region within the surface of the electro-optic crystal substrate and excluding the ridge portion. These first and second electrodes may be used as electrodes for applying an electric signal (that is, an electric field) to the ridge type optical waveguide in the electro-optic element manufactured from the composite substrate.

In an embodiment in which the electro-optic crystal substrate comprises the ridge portion, an optical waveguide region containing impurities may be defined within the ridge portion along a longitudinal direction of the ridge portion. According to such a configuration, by changing a region where the impurities are to be doped, a desired optical waveguide can easily be fabricated without modifying the ridge portion.

Representative, non-limiting examples of the present disclosure will now be described in further detail with reference to the attached drawings. This detailed description is merely intended to teach a person of skill in the art further details for practicing aspects of the present teachings and is not intended to limit the scope of the present disclosure. Furthermore, each of the additional features and teachings disclosed below may be utilized separately or in conjunction with other features and teachings to provide improved composite substrates, as well as methods for using and manufacturing the same.

Moreover, combinations of features and steps disclosed in the following detailed description may not be necessary to practice the present disclosure in the broadest sense and are instead taught merely to particularly describe representative examples of the present disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of the original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of the original written disclosure, as well as for the purpose of restricting the claimed subject matter.

EMBODIMENTS (First Embodiment) A composite substrate 10 and a method of manufacturing the same will be described with reference to the drawings. The composite substrate 10 of the present embodiment may be employed in various electro-optic elements such as an optical modulator. As shown in FIG. 1, the composite substrate 10 of the present embodiment is manufactured in a form of a so-called wafer and is supplied to a manufacturer of the electro-optic element as such. Although this is merely an example, the diameter of the composite substrate 10 is about 10 centimeters (4 inches). Normally, a plurality of electro-optic elements is manufactured from one composite substrate 10. The composite substrate 10 may not be limited to the form of a wafer and may be manufactured in various forms and supplied as such.

Figure 2:
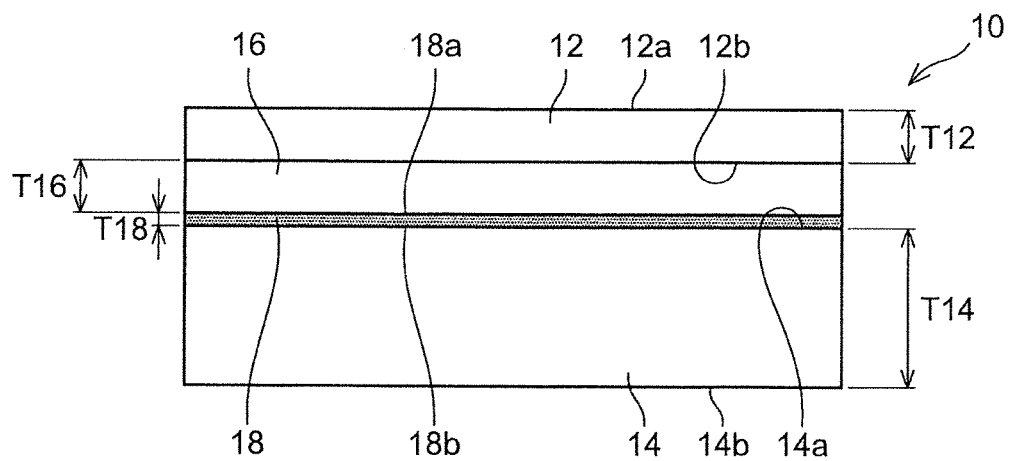
FIG. 2 schematically shows a cross-sectional structure of the composite substrate 10 of the first embodiment.

As shown in FIGS. 1 and 2, the composite substrate 10 includes an electro-optic crystal substrate 12, a support substrate 14, a low-refractive-index layer 16, and an amorphous layer 18. The electro-optic crystal substrate 12 is bonded to the support substrate 14 via the low-refractive-index layer 16 and the amorphous layer 18. These substrates 12, 14 and layers 16, 18 extend parallel to each other throughout the composite substrate 10.

The electro-optic crystal substrate 12 includes a top surface 12a exposed to the outside and a bottom surface 12b located inside the composite substrate 10. A part of or an entirety of the electro-optic crystal substrate 12 is structured as an optical waveguide configured to transmit light in an electro-optic element manufactured from the composite substrate 10. The electro-optic crystal substrate 12 is constituted of a crystal of a material having an electro-optic effect. More specifically, when an electric field is applied to the electro-optic crystal substrate 12, the refractive index of the electro-optic crystal substrate 12 thereby changes. Specially, when the electric field is applied along a c-axis of the electro-optic crystal substrate 12, the refractive index of the electro-optic crystal substrate 12 changes significantly. Here, the c-axis of the electro-optic crystal substrate 12 may be parallel to the electro-optic crystal substrate 12. That is, the electro-optic crystal substrate 12 may for example be a x-cut or y-cut substrate. Alternatively, the c-axis of the electro-optic crystal substrate 12 may be perpendicular to the electro-optic crystal substrate 12. That is, the electro-optic crystal substrate 12 may for example be a z-cut substrate. A thickness T12 of the electro-optic crystal substrate 12 may for example be, but not particularly limited to, 0.1 micrometers or more and 10 micrometers or less.

The material constituting the electro-optic crystal substrate 12 may be, but not particularly limited to, a substrate of lithium niobate ($LiNbO_3$: LN), lithium tantalate ($LiTaO_3$: LT), potassium titanyl phosphate ($KTiOPO_4$: KTP), potassium lithium niobate ($K_xLi_{(1-x)}NbO_2$: KLN), potassium niobate ($KNbO_3$: KN), potassium tantalate niobate ($KNb_xTa_{(1-x)}O_3$: KTN), or a solid solution of lithium niobate and lithium tantalite. The electro-optic crystal substrate 12 may have an electro-optic effect of changing other optical constants, in addition to or as an alternative to the refractive index.

The support substrate 14 includes a top surface 14a located inside the composite substrate 10 and a bottom surface 14b exposed to the outside. The electro-optic crystal substrate 12 is bonded to the support substrate 14. The support substrate 14 is provided to increase the strength of the composite substrate 10, by which the thickness of the electro-optic crystal substrate 12 can be reduced. The support substrate 14 may be, but not particularly limited to, a substrate of silicon (Si), glass, sialon ($Si_3N_4$—$Al_2O_3$), mullite ($3Al_2O_3 \cdot 2SiO_2$, $2Al_2O_3 \cdot SiO_2$), aluminum nitride (AlN), silicon nitride ($Si_3N_4$), magnesium oxide (MgO), sapphire, quartz, crystal, gallium nitride (GaN), silicon carbide (SiC), or gallium oxide ($Ga_2O_3$), for example. In order to suppress the thermal deformation (especially warping) of the composite substrate 10, the linear expansion coefficient of a material constituting the support substrate 14 is preferably closer to the linear expansion coefficient of the material constituting the electro-optic crystal substrate 12. Although not particularly limited, the linear expansion coefficient of a material constituting the support substrate 24 is preferably within a range of ±50 percent of the linear expansion coefficient of the material constituting the electro-optic crystal substrate 12.

The low-refractive-index layer 16 is located between the electro-optic crystal substrate 12 and the amorphous layer 18 and is disposed along the bottom surface 12b of the electro-optic crystal substrate 12. The low-refractive-index layer 16 has a lower refractive index than the electro-optic crystal substrate 12. Due to this, the light transmitted through the electro-optic crystal substrate 12 tends to be fully reflected on the bottom surface 12b of the electro-optic crystal substrate 12 (that is, an interface contacting the low-refractive-index layer 16) and thus is suppressed from leaking from the electro-optic crystal substrate 12. The low-refractive-index layer 16 may be constituted of, but not particularly limited to, at least one selected from a group consisting of silicon oxide ($SiO_2$), tantalum oxide ($Ta_2O_5$), aluminum oxide ($Al_2O_3$), magnesium fluoride ($MgF_2$), and calcium fluoride ($MgF_2$), for example. A thickness T16 of the low-refractive-index layer 16 may be, but not particularly limited to, 0.1 micrometer or more and 10 micrometers or less, for example.

Generally, a refractive index is proportional to the square root of the dielectric constant. Since the refractive index of the low-refractive-index layer 16 is lower than the refractive index of the electro-optic crystal substrate 12, the dielectric constant of the low-refractive-index layer 16 is lower than the dielectric constant of the electro-optic crystal substrate 12. Thus, when the composite substrate 10 has the low-refractive-index layer 16, it becomes easy to satisfy a speed matching condition and adjust a characteristic impedance in the electro-optic elements manufactured from the composite substrate 10. Further, since stray capacitance and dielectric loss can be reduced, fast-speed operation and voltage reduction of the electro-optic element are enabled.

The amorphous layer 18 is located between the low-refractive-index layer 16 and the support substrate 14. The amorphous layer 18 has an amorphous structure and is constituted of elements constituting the low-refractive-index layer 16 contacting the amorphous layer 18 from above and elements constituting the support substrate 14 contacting the amorphous layer 18 from below. The thickness T18 of the amorphous layer 18 may be, but not particularly limited to, 0.1 nanometer or more and 100 nanometers or less. As will be described later, the composite substrate 10 can be manufactured by directly bonding the support substrate 14 to the electro-optic crystal substrate 12 on which the low-refractive-index layer 16 is deposited. The amorphous layer 18 is a layer generated by this direct bonding and is formed by atoms in the low-refractive-index layer 16 and the support substrate 14 diffusing. As such, a top surface 18a of the amorphous layer 18 (that is, an interface contacting the low-refractive-index layer 16) and a bottom surface 18b of the amorphous layer 18 (that is, an interface contacting the support substrate 14) are not necessarily flat.

Generally, an amorphous layer generated by the direct bonding is constituted of elements constituting materials located above and below the amorphous layer and does not have crystallinity, and different elements may be incorporated to the amorphous layer from outside, thus the optical properties of the amorphous layer differs from those of the materials located above and below. Further, the interfaces of the amorphous layer are not flat, and optical absorption and diffusion may occur. Due to this, if the amorphous layer 18 directly contacts the electro-optic crystal substrate 12, the light transmitted through the electro-optic crystal substrate 12 is attenuated by the amorphous layer 18. Contrary to this, in the composite substrate 10 of the present embodiment, the low-refractive-index layer 16 is interposed between the amorphous layer 18 and the electro-optic crystal substrate 12, and the amorphous layer 18 is not in contact with the electro-optic crystal substrate 12. As such, the light transmitted through the electro-optic crystal substrate 12 is not diffused by the amorphous layer 18 or on the top surface 18a thereof. In addition, the low-refractive-index layer 16 contacting the electro-optic crystal substrate 12 has the lower refractive index than the electro-optic crystal substrate 12, by which it can suppress the leakage of the light transmitting through the electro-optic crystal substrate 12 and propagate the same in the optical waveguide, similar to a clad in an optical fiber.

As above, in the composite substrate 10 of the present embodiment, since the electro-optic crystal substrate 12 is strengthened by the support substrate 14, the thickness T12 of the electro-optic crystal substrate 12 can be made relatively small. Further, since an optical waveguide structure with an excellent optical confinement effect can be constructed due to the low-refractive-index layer 16, the light can be propagated in a high-quality bulk crystal with no impurities doped therein. Further, the electro-optic crystal substrate 12 and the support substrate 14 are directly bonded without using an adhesive and thus are free of deterioration and deformation of the adhesive and have a high reliability. Further, a dielectric loss caused by the adhesive also does not occur. Further, since the amorphous layer 18 generated by the direct bonding is separated from the electro-optic crystal substrate 12 by the low-refractive-index layer 16, the light transmitted through the electro-optic crystal substrate 12 can be propagated toward an output side without causing any loss.

Figure 3:
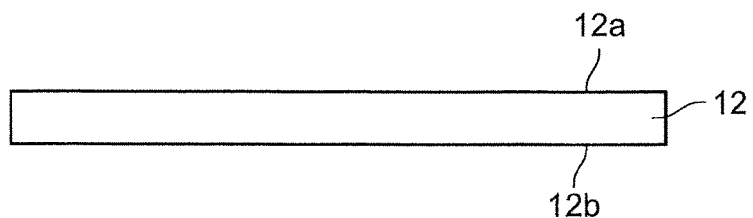
FIG. 3 shows a step of a method of manufacturing the composite substrate 10 of the first embodiment.
Figure 4:
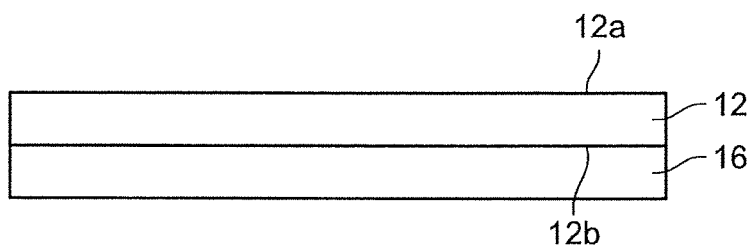
FIG. 4 shows a step of the method of manufacturing the composite substrate 10 of the first embodiment.
Figure 5:
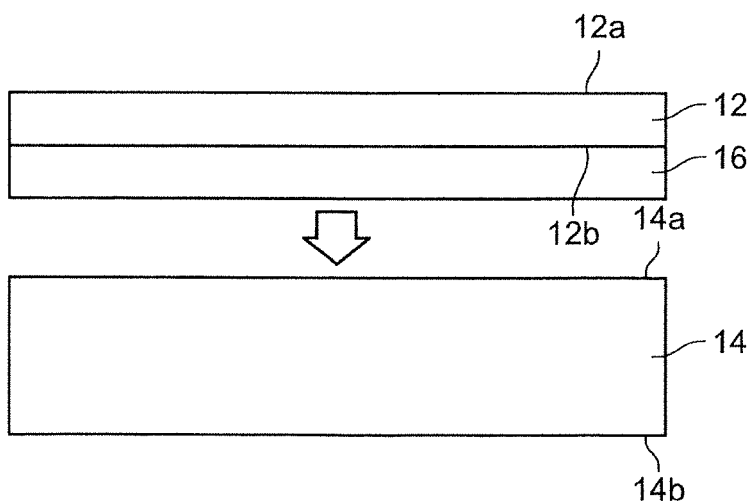
FIG. 5 shows a step of the method of manufacturing the composite substrate 10 of the first embodiment.

Next, a method of manufacturing the composite substrate 10 will be described with reference to FIGS. 3 to 5. Firstly, as shown in FIG. 3, the electro-optic crystal substrate 12 is prepared. The electro-optic crystal substrate 12 may be an x-cut or y-cut substrate (with the c-axis being parallel to the substrate). Further, in a case where a reverse polarized portion is formed, the electro-optic crystal substrate 12 may be an offset substrate in which the c-axis and a horizontal surface of the substrate meet at an angle of 10° or less. Alternatively, it may be a z-cut substrate (with the c-axis being perpendicular to the substrate). Next, as shown in FIG. 4, the low-refractive-index layer 16 is deposited on the bottom surface 12b of the electro-optic crystal substrate 12. This deposition of the low-refractive-index layer 16 may be executed by, but not particularly limited to, vapor deposition (physical vapor deposition or chemical vapor deposition). The bottom surface 12b of the electro-optic crystal substrate 12 is one of the main surfaces of the electro-optic crystal substrate 12. Next, as shown in FIG. 5, the support substrate 14 is prepared, and the support substrate 14 is directly bonded to the bottom surface 12b of the electro-optic crystal substrate 12 on which the low-refractive-index layer 16 is deposited. At this occasion, the aforementioned amorphous layer 18 is formed between the support substrate 14 and the low-refractive-index layer 16. Due to this, the composite substrate 10 shown in FIGS. 1 and 2 is manufactured.

In regard to the aforementioned direct bonding, the specific order of processes and processing condition are not particularly limited. These may suitably be set according to respective materials of the layers or substrates to be bonded to each other. As one example, in the manufacturing method of the present embodiment, firstly, a neutralization beam is irradiated onto each of the bonding surfaces in a high vacuum chamber (such as at about $1 \times 10^{-6}$ Pascal). Due to this, the respective bonding surfaces are activated. Then, the activated bonding surfaces are brought into contact with each other in a high vacuum atmosphere and are bonded at a normal temperature. A load at this bonding can be set for example to 100 to 20000 Newtons. In this manufacturing method, upon executing surface activation by the neutralization beam, an inert gas is introduced into the chamber and a high voltage is applied from a DC power source to an electrode disposed inside the chamber. Due to this, an electric field is generated between the electrode (positive electrode) and the chamber (negative electrode) and then electrons move, by which a beam constituted of atoms and ions is generated from the inert gas. When the beam reaches a grid, the ion beam is neutralized by the grid, by which a neutral atom beam is emitted from a fast atom beam source. The atomic specie constituting the beam is preferably an inert gas element (such as argon (Ar), nitrogen (N), etc.). The voltage upon the activation by the beam irradiation may be set to 0.5 to 2.0 kilovolts and the current thereof may be set to 50 to 200 milliamperes.

Figure 6:
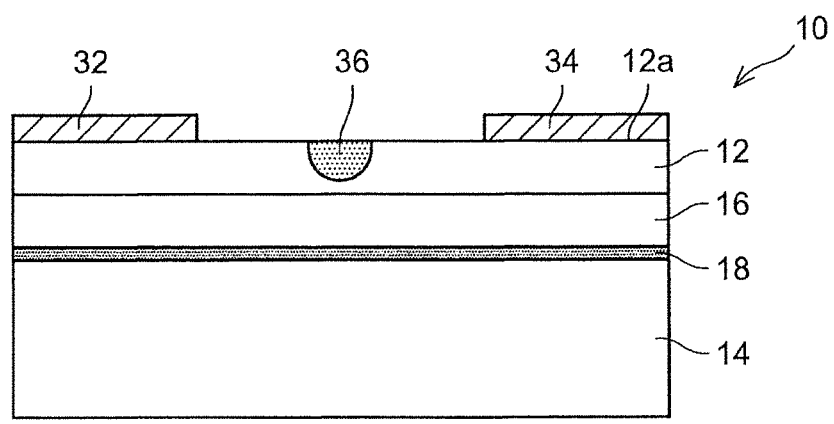
FIG. 6 shows a variant of the composite substrate 10, and electrodes 32, 34 configured to generate an electric field in an electro-optic crystal substrate 12 and an optical waveguide region 36 arranged in the electro-optic crystal substrate 12 are added.

As shown in FIG. 6, in the composite substrate 10, electrodes 32, 34 for forming an electric field in the electro-optic crystal substrate 12 may be mounted on the top surface 12a of the electro-optic crystal substrate 12. The material constituting the electrodes 32, 34 may simply need to be a conductor, and may be a metal such as gold (Au), silver (Ag), copper (Cu), aluminum (Al), and platinum (Pt). The electrodes 32, 34 may each include a layer of titanium (Ti), chromium (Cr), nickel (Ni), or platinum (Pt) as a base layer (lowermost layer) contacting the electro-optic crystal substrate 12 for preventing exfoliation and migration of the electrodes 32, 34. The number, position and shape of the electrodes 32, 34 are not particularly limited. For example, as to the number of the electrodes 32, 34, they may suitably be set according to the number of electro-optic elements to be manufactured from the composite substrate 10 and the number of the electrodes 32, 34 which each electro-optic element requires. When the electrodes 32, 34 are pre-mounted on the composite substrate 10, a manufacturer of the electro-optic elements can easily manufacture the electro-optic elements from the composite substrate 10. The electrodes 32, 34 shown in FIG. 6 may be mounted similarly to the composite substrates 10a to 10j of other embodiments to be described later.

In addition to or alternatively, an optical waveguide region 36 may be disposed in the electro-optic crystal substrate 12 by doping impurities. In the electro-optic crystal substrate 12, the refractive index can be selectively (that is, locally) increased by doping specific impurities such as titanium or zinc and the optical waveguide region 36 can thereby be constructed. The number, position and shape of the optical waveguide region 36 are not particularly limited. For example, as to the number of the optical waveguide region 36, it may suitably be set according to the number of electro-optic elements to be manufactured from the composite substrate 10 and the number of the optical waveguide region 36 which each electro-optic element requires. When the optical waveguide region 36 is disposed in advance in the composite substrate 10, the manufacturer of the electro-optic elements can easily manufacture the electro-optic elements from the composite substrate 10. The optical waveguide region 36 shown in FIG. 6 may be disposed similarly in the composite substrates 10a to 10j of other embodiments to be described later.

Figure 7:
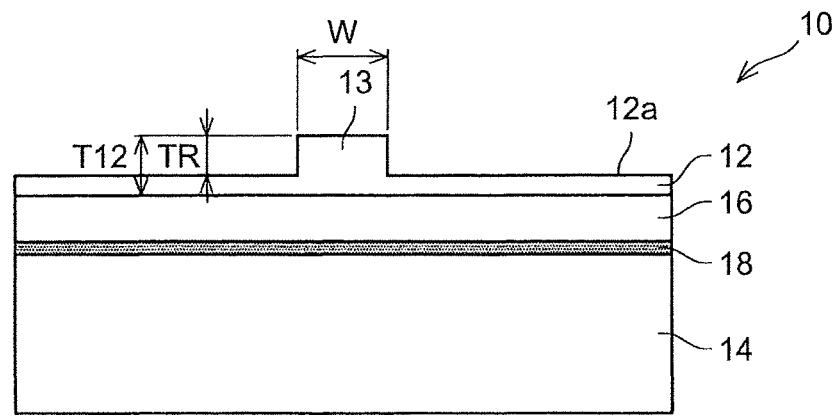
FIG. 7 shows a variant of the composite substrate 10, and a ridge portion 13 is arranged on a top surface 12a of the electro-optic crystal substrate 12.

As shown in FIG. 7, a ridge portion 13 may be disposed on the top surface 12a of the electro-optic crystal substrate 12. The ridge portion 13 is a protruding portion extending in an elongate shape along the top surface 12a. The ridge portion 13 configures a ridge type optical waveguide in the electro-optic element manufactured from the composite substrate 10. When the ridge portion 13 is disposed on the composite substrate 10 in advance, electro-optic elements requiring the ridge type optical waveguide can easily be manufactured. The width W of the ridge portion 13 may be, but not particularly limited to, 1 micrometer or more and 10 micrometers or less. The height TR of the ridge portion 13 may be, but also not particularly limited to, 10 percent or more and 95 percent or less of the thickness T12 of the electro-optic crystal substrate 12. The number, position and shape of the ridge portion 13 are also not particularly limited. Although this is merely an example, when the composite substrate 10 is used for manufacturing a Mach-Zehnder electro-optic modulator, two ridge portions 13, at least partially extending parallel to each other, are preferably disposed. The ridge portion 13 shown in FIG. 7 may be disposed similarly in the composite substrates 10a to 10j of other embodiments to be described later.

Figure 8:
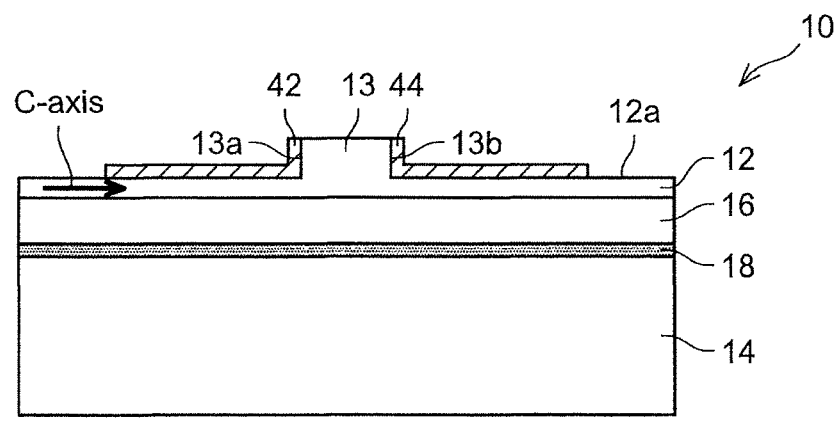
FIG. 8 shows a variant of the composite substrate 10, and, as compared to the variant shown in FIG. 7, a first electrode 42 and a second electrode 44 are added. In this variant, a c-axis of the electro-optic crystal substrate 12 is parallel to the electro-optic crystal substrate 12.

As shown in FIG. 8, the composite substrate 10 including the ridge portion 13 may further include a first electrode 42 and a second electrode 44. Here, in the case where the c-axis of the electro-optic crystal substrate 12 is parallel to the electro-optic crystal substrate 12, the first electrode 42 is preferably mounted on one side surface 13a of the ridge portion 13. Further, the second electrode 44 is preferably mounted on another side surface 13b of the ridge portion 13 to oppose the first electrode 42 across the ridge portion 13. According to such a configuration, the first electrode 42 and the second electrode 44 can apply an electric field parallel to the c-axis with respect to the ridge portion 13 that is to be the optical waveguide in the electro-optic element. A material constituting the first electrode 42 and the second electrode 44 may simply need to be a conductor and may be a metal such as gold (Au), copper (Cu), and aluminum (Al). The electrodes 42, 44 may each include a layer of titanium (Ti), chromium (Cr), nickel (Ni), or platinum (Pt) as a base layer (lowermost layer) contacting the electro-optic crystal substrate 12 for preventing exfoliation and migration of the electrodes 42, 44. Further, a low-refractive-index film having a lower refractive index than the electro-optic crystal substrate 12 may be disposed between the first electrode 42 and the electro-optic crystal substrate 12 and also between the second electrode 44 and the electro-optic crystal substrate 12. Such a low-refractive-index film functions as a cladding layer and can suppress the loss in light transmitted through the ridge portion 13. Together with the ridge portion 13, the first electrode 42 and the second electrode 44 shown in FIG. 8 may be mounted similarly to the composite substrates 10a to 10j of the other embodiments to be described later.

Figure 9:
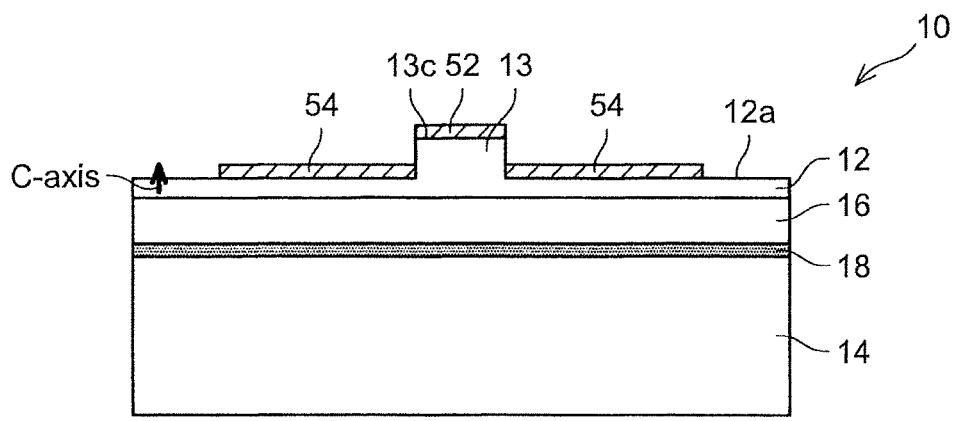
FIG. 9 shows a variant of the composite substrate 10, and, as compared to the variant shown in FIG. 7, a first electrode 52 and a second electrode 54 are added. In this variant, the c-axis of the electro-optic crystal substrate 12 is perpendicular to the electro-optic crystal substrate 12.

As shown in FIG. 9, the c-axis of the electro-optic crystal substrate 12 may be perpendicular to the electro-optic crystal substrate 12. In this case as well, the ridge portion 13 may be disposed on the top surface 12a of the electro-optic crystal substrate 12. Further, a first electrode 52 and a second electrode 54 may be mounted on the top surface 12a of the electro-optic crystal substrate 12. However, the first electrode 52 is preferably mounted on a top surface 13c of the ridge portion 13 and the second electrode 54 may preferably be provided in a region within the top surface 12a of the electro-optic crystal substrate 12 excluding the ridge portion 13. According to such a configuration, the first electrode 52 and the second electrode 54 can apply an electric field parallel to the c-axis with respect to the ridge portion 13 that is to be the optical waveguide in the electro-optic element. Together with the ridge portion 13, the first electrode 52 and the second electrode 54 shown in FIG. 9 may be mounted similarly to the composite substrates 10a to 10j of other embodiments to be described later. In cases where the composite substrates 10a to 10j are provided with conductive layers 20, 20', the conductive layers 20, 20' may each be used as a substitute to the second electrode 54. In these cases, the second electrode 54 may not be necessary and thus may be omitted.

Figure 10:
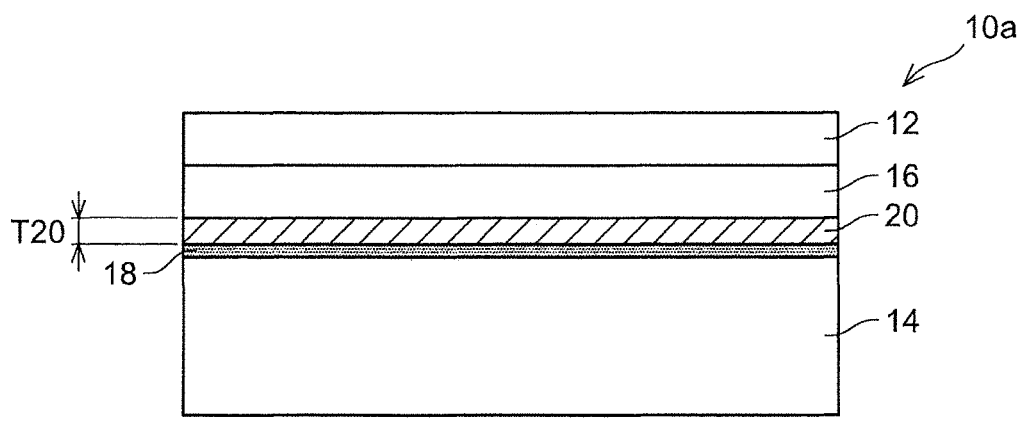
FIG. 10 schematically shows a cross-sectional structure of a composite substrate 10a of a second embodiment.

(Second Embodiment) A composite substrate 10a of a second embodiment will be described with reference to FIGS. 10 and 11. As shown in FIG. 10, the composite substrate 10a of the second embodiment further includes a first conductive layer 20 and thus differs from the composite substrate 10 of the first embodiment in this regard. The first conductive layer 20 is located between the low-refractive-index layer 16 and the amorphous layer 18 and contacts the amorphous layer 18 from above. As such, the amorphous layer 18 in the present embodiment is constituted of elements constituting the first conductive layer 20 and the elements constituting the support substrate 14. The first conductive layer 20 may be used as an electrode for applying an electric signal (that is, an electric field) to the electro-optic crystal substrate 12 in an electro-optic element manufactured from the composite substrate 10a. Alternatively, the first conductive layer 20 may be used as a shield for suppressing the electric field from leaking from the electro-optic element.

A material constituting the first conductive layer 20 may simply be a conductor, and for example, it may include a layer of gold (Au), silver (Ag), copper (Cu), aluminum (Al), platinum (Pt), or an alloy containing at least two of the aforementioned elements. The first conductive layer 20 may have a single layer structure or a multiple layer structure. The first conductive layer 20 may include a layer of titanium (Ti), chromium (Cr), nickel (Ni), or platinum (Pt) as a base layer contacting the low-refractive-index layer 16 for preventing exfoliation and migration of the first conductive layer 20. The thickness T20 of the first conductive layer may be, but not particularly limited to, 0.05 micrometer or more and 5 micrometers or less.

Figure 11:
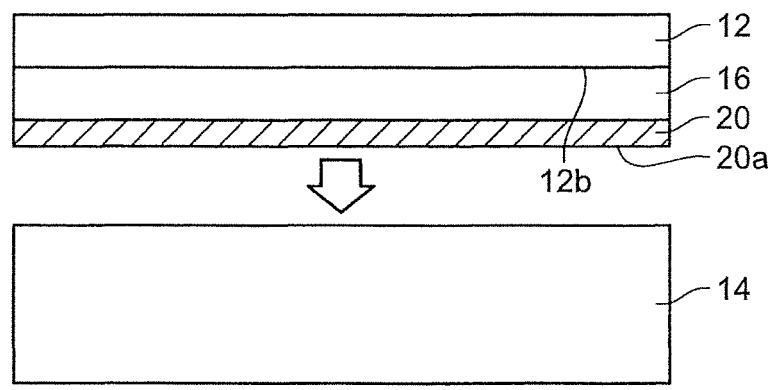
FIG. 11 is a diagram explaining a method of manufacturing the composite substrate 10a of the second embodiment.

As shown in FIG. 11, the composite substrate 10a of the present embodiment can also be manufactured by directly bonding the electro-optic crystal substrate 12 to the support substrate 14. However, in a manufacturing method of the present embodiment, the low-refractive-index layer 16 and the first conductive layer 20 are deposited on the bottom surface 12b of the electro-optic crystal substrate 12 prior to performing the direct bonding. The low-refractive-index layer 16 is deposited on the bottom surface 12b of the electro-optic crystal substrate 12 and the first conductive layer 20 is deposited on the low-refractive-index layer 16. As such, the direct bonding in this embodiment is performed between the first conductive layer 20 and the support substrate 14. In this case, a surface layer 20a of the first conductive layer 20 may be constituted of platinum. Platinum is a material suitable for direct bonding. Due to this, when the surface layer 20a of the first conductive layer 20 is constituted of platinum, the electro-optic crystal substrate 12 on which the first conductive layer 20 is deposited can suitably be bonded directly to the support substrate 14. The deposition of the first conductive layer 20 may be performed, for example, by sputtering or vapor deposition (physical vapor deposition or chemical vapor deposition).

Figure 12:
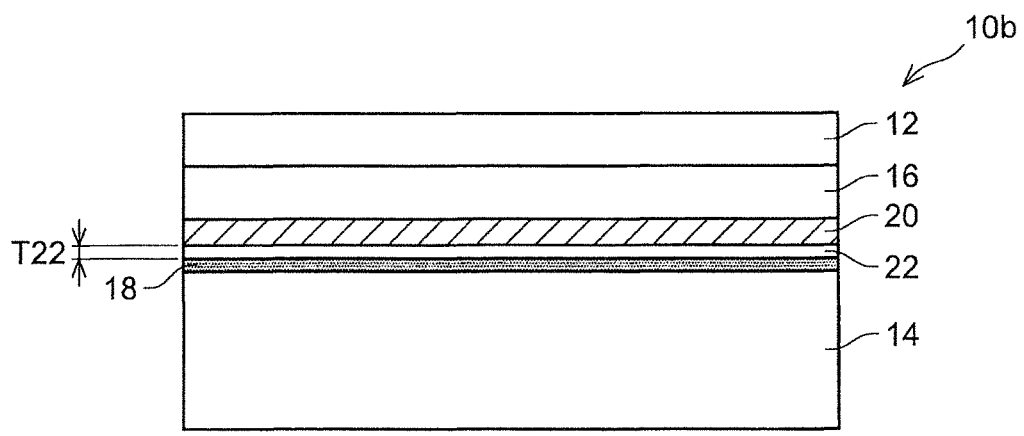
FIG. 12 schematically shows a cross-sectional structure of a composite substrate 10b of a third embodiment.

(Third Embodiment) A composite substrate 10b of a third embodiment will be described with reference to FIGS. 12 and 13. As shown in FIG. 12, the composite substrate 10b of the third embodiment further includes a first bonding layer 22, and thus differs from the composite substrate 10b of the second embodiment in this regard. The first bonding layer 22 is located between the first conductive layer 20 and the amorphous layer 18 and contacts the amorphous layer 18 from above. As such, the amorphous layer 18 in the present embodiment is constituted of elements constituting the first bonding layer 22 and the elements constituting the support substrate 14.

A material constituting the first bonding layer 22 preferably is, a material suitable for direct bonding, such as, but not particularly limited to, tantalum oxide ($Ta_2O_5$), niobium oxide ($Nb_2O_5$), silicon (Si), aluminum oxide ($Al_2O_3$), and titanium oxide ($TiO_2$), for example. A thickness T22 of the first bonding layer 22 may be, but not particularly limited to, 0.01 micrometer or more and 0.5 micrometer or less. Since the first bonding layer 22 is separated from the electro-optic crystal substrate 12 by the first conductive layer 20, it does not substantially affect the characteristics of the composite substrate 10b.

Figure 13:
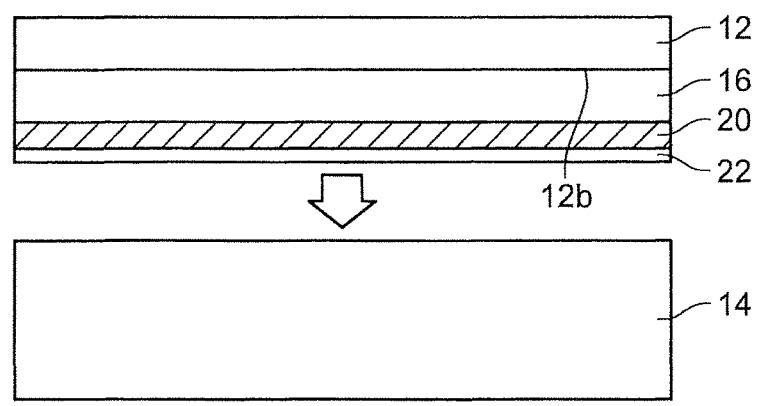
FIG. 13 shows a diagram explaining a method of manufacturing the composite substrate 10b of the third embodiment.

As shown in FIG. 13, the composite substrate 10b of the present embodiment can also be manufactured by directly bonding the electro-optic crystal substrate 12 to the support substrate 14. However, in a manufacturing method of the present embodiment, the low-refractive-index layer 16, the first conductive layer 20 and the first bonding layer 22 are deposited on the bottom surface 12b of the electro-optic crystal substrate 12 prior to performing the direct bonding. The low-refractive-index layer 16 is deposited on the bottom surface 12b of the electro-optic crystal substrate 12 and the first conductive layer 20 is deposited on the low-refractive-index layer 16. The first bonding layer 22 is deposited on the first conductive layer 20. As such, the direct bonding in this embodiment is performed between the first bonding layer 22 and the support substrate 14. Since the first bonding layer 22 is constituted of a material suitable for direct bonding, the electro-optic crystal substrate 12 on which the first bonding layer 22 is deposited can suitably be bonded directly to the support substrate 14. The deposition of the first bonding layer 22 may be performed by, but not particularly limited to, sputtering or vapor deposition (physical vapor deposition or chemical vapor deposition).

Figure 14:
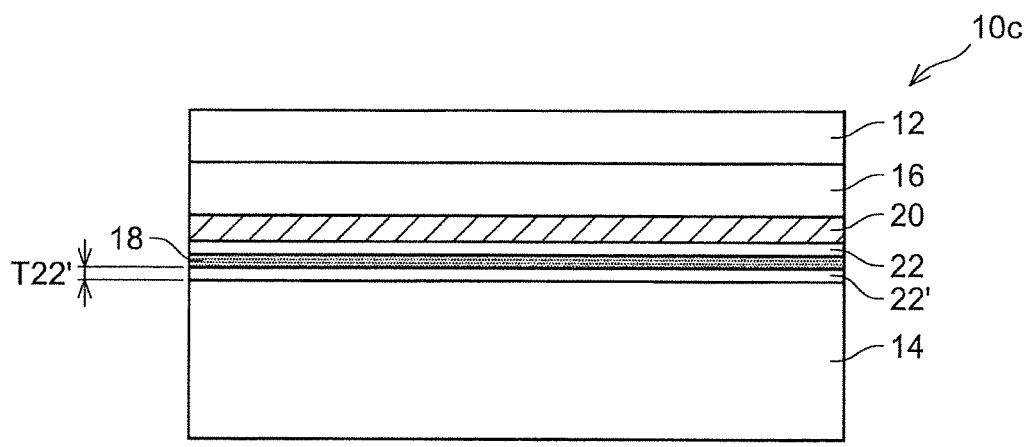
FIG. 14 schematically shows a cross-sectional structure of a composite substrate 10c of a fourth embodiment.

(Fourth Embodiment) A composite substrate 10c of a fourth embodiment will be described with reference to FIGS. 14 and 15. As shown in FIG. 14, the composite substrate 10c of the fourth embodiment further includes a second bonding layer 22' and thus differs from the composite substrate 10c of the third embodiment in this regard. The second bonding layer 22' is located between the amorphous layer 18 and the support substrate 14 and contacts the amorphous layer 18 from below. As such, the amorphous layer 18 in the present embodiment is constituted of the elements constituting the first bonding layer 22 and elements constituting the second bonding layer 22'.

A material constituting the second bonding layer 22' preferably is a material suitable for direct bonding such as, but not particularly limited to, tantalum oxide ($Ta_2O_5$), niobium oxide ($Nb_2O_5$), silicon (Si), aluminum oxide ($Al_2O_3$), and titanium oxide ($TiO_2$), for example. The thickness T22' of the second bonding layer 22' may be, but not particularly limited to, 0.01 micrometer or more and 0.5 micrometer or less. Since the second bonding layer 22' is separated from the electro-optic crystal substrate 12 by the first conductive layer 20, it does not substantially affect the characteristics of the composite substrate 10c.

Figure 15:
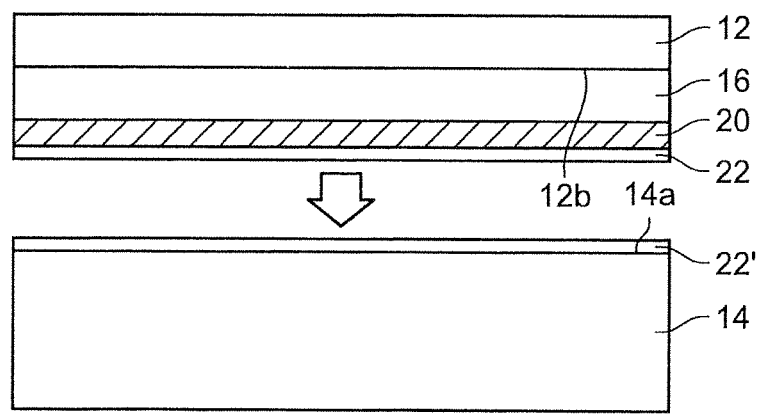
FIG. 15 shows a diagram explaining a method of manufacturing the composite substrate 10c of the fourth embodiment.

As shown in FIG. 15, the composite substrate 10c of the present embodiment can also be manufactured by directly bonding the electro-optic crystal substrate 12 to the support substrate 14. However, in the manufacturing method of the present embodiment, the second bonding layer 22' is deposited on the top surface 14a of the support substrate 14 prior to performing the direct bonding. The low-refractive-index layer 16, the first conductive layer 20 and the first bonding layer 22 are deposited on the bottom surface 12b of the electro-optic crystal substrate 12, similar to the third embodiment. As such, the direct bonding in this embodiment is performed between the first bonding layer 22 and the second bonding layer 22'. Since the first bonding layer 22 and the second bonding layer 22' are constituted of material (s) suitable for direct bonding, the electro-optic crystal substrate 12 on which the first bonding layer 22 is deposited can suitably be bonded directly to the support substrate 14 on which the second bonding layer 22' is deposited. The deposition of the second bonding layer 22' may be performed for example by vapor deposition (physical vapor deposition or chemical vapor deposition), similar to the first bonding layer 22.

Figure 16:
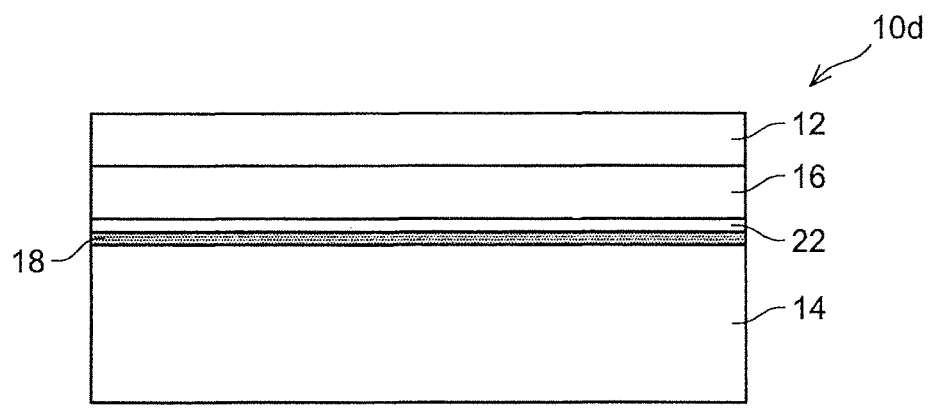
FIG. 16 schematically shows a cross-sectional structure of a composite substrate 10d of a fifth embodiment.
Figure 17:
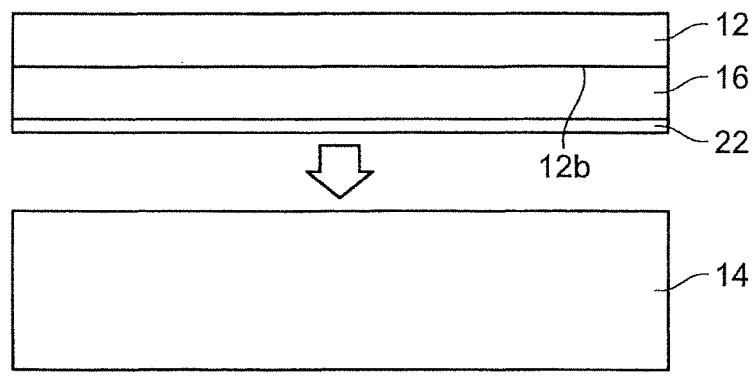
FIG. 17 shows a diagram explaining a method of manufacturing the composite substrate 10d of the fifth embodiment.

(Fifth Embodiment) A composite substrate 10d of a fifth embodiment will be described with reference to FIGS. 16 and 17. As shown in FIG. 16, the composite substrate 10d of the fifth embodiment does not include the first conductive layer 20 and thus differs from the composite substrate 10b of the third embodiment in this regard. That is, the first conductive layer 20 may not be necessarily required. As shown in FIG. 17, the composite substrate 10d of the present embodiment can also be manufactured by directly bonding the electro-optic crystal substrate 12 to the support substrate 14. In a manufacturing method of the present embodiment, the low-refractive-index layer 16 and the first bonding layer 22 are deposited on the bottom surface 12b of the electro-optic crystal substrate 12 prior to performing the direct bonding. The low-refractive-index layer 16 is deposited on the bottom surface 12b of the electro-optic crystal substrate 12, and the first bonding layer 22 is deposited on the low-refractive-index layer 16. As such, the direct bonding in this embodiment is performed between the first bonding layer 22 and the support substrate 14.

Figure 18:
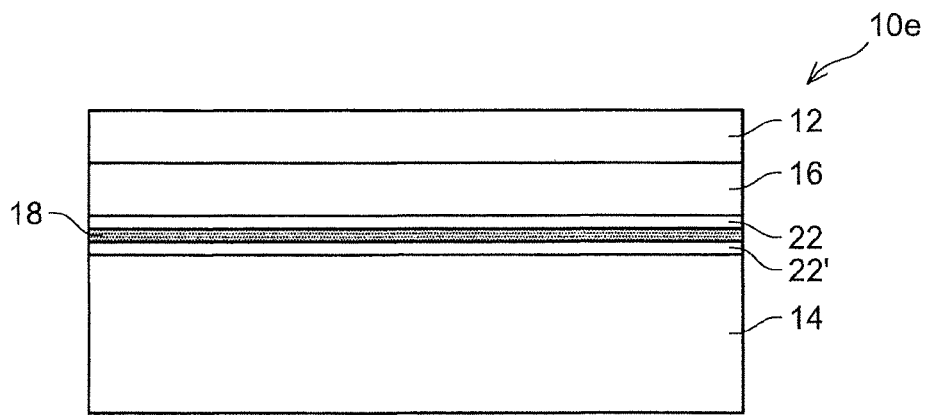
FIG. 18 schematically shows a cross-sectional structure of a composite substrate 10e of a sixth embodiment.
Figure 19:
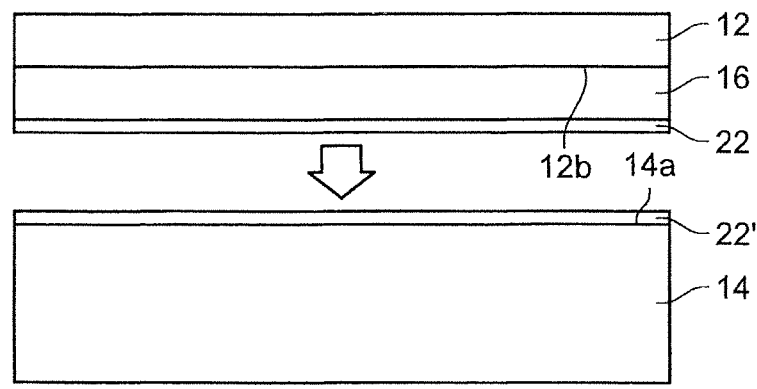
FIG. 19 shows a diagram explaining a method of manufacturing the composite substrate 10e of the sixth embodiment.

(Sixth Embodiment) A composite substrate 10e of a sixth embodiment will be described with reference to FIGS. 18 and 19. As shown in FIG. 18, the composite substrate 10e of the sixth embodiment further includes the second bonding layer 22' and thus differs from the composite substrate 10d of the fifth embodiment in this regard. In other words, the composite substrate 10e of the present embodiment does not include the first conductive layer 20 and thus differs from the composite substrate 10c of the fourth embodiment in this regard. As shown in FIG. 19, the composite substrate 10e of the present embodiment can also be manufactured by directly bonding the electro-optic crystal substrate 12 to the support substrate 14. In a manufacturing method of the present embodiment, the low-refractive-index layer 16 and the first bonding layer 22 are formed on the bottom surface 12b of the electro-optic crystal substrate 12 prior to performing the direct bonding. Further, the second bonding layer 22' is deposited on the top surface 14a of the support substrate 14. As such, the direct bonding in this embodiment is performed between the first bonding layer 22 and the second bonding layer 22'.

Figure 20:
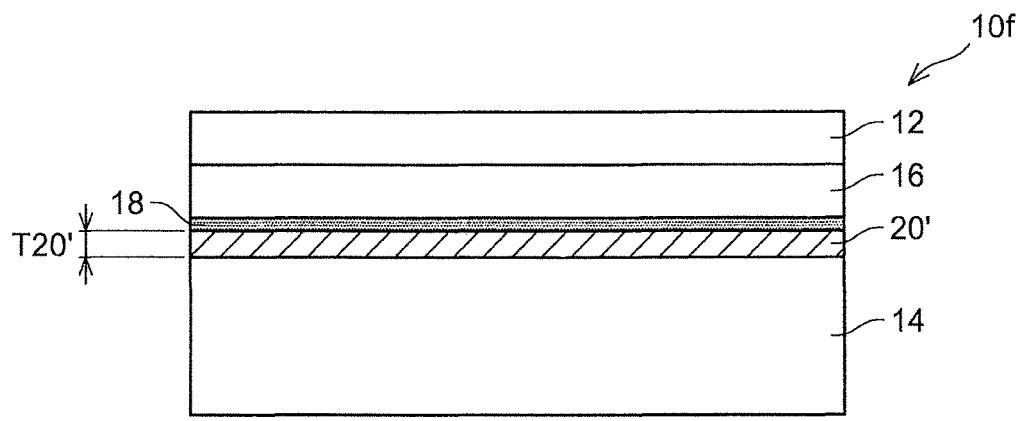
FIG. 20 schematically shows a cross-sectional structure of a composite substrate 10f of a seventh embodiment.

(Seventh Embodiment) A composite substrate 10f of a seventh embodiment will be described with reference to FIGS. 20 and 21. As shown in FIG. 20, the composite substrate 10f of the seventh embodiment further includes a second conductive layer 20' and thus differs from the composite substrate 10 of the first embodiment in this regard. The second conductive layer 20' is located between the amorphous layer 18 and the support substrate 14 and contacts the amorphous layer 18 from below. As such, the amorphous layer 18 in the present embodiment is constituted of elements constituting the low-refractive-index layer 16 and elements constituting the second conductive layer 20'.

The second conductive layer 20' may be used as an electrode for applying an electric signal (that is, an electric field) to the electro-optic crystal substrate 12 in an electro-optic element manufactured from the composite substrate 10f. Alternatively, the second conductive layer 20' may be used as a shield for suppressing the electric field from leaking from the electro-optic element.

The material constituting the second conductive layer 20' may simply be a conductor and, for example, may include a layer of gold (Au), silver (Ag), copper (Cu), aluminum (Al), platinum (Pt), or an alloy containing at least two of the aforementioned elements. The second conductive layer 20' may have a single layer structure or a multiple layer structure. The second conductive layer 20' may include a layer of titanium (Ti), chromium (Cr), nickel (Ni), or platinum (Pt) as a base layer contacting the support substrate 14 for preventing exfoliation and migration of the second conductive layer 20'. The thickness T20' of the second conductive layer 20' may be, but not particularly limited to, 0.05 micrometer or more and 5 micrometers or less.

Figure 21:
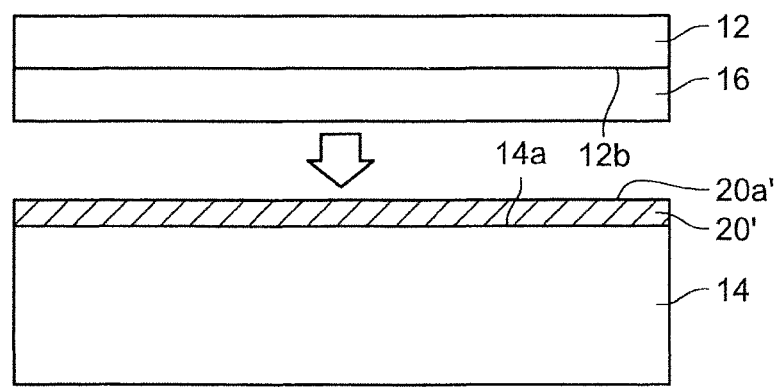
FIG. 21 shows a diagram explaining a method of manufacturing the composite substrate 10f of the seventh embodiment.

As shown in FIG. 21, the composite substrate 10f of the present embodiment can also be manufactured by directly bonding the electro-optic crystal substrate 12 to the support substrate 14. However, in the manufacturing method of the present embodiment, the second conductive layer 20' is deposited on the top surface 14a of the support substrate 14 prior to performing the direct bonding. The low-refractive-index layer 16 is deposited on the bottom surface 12b of the electro-optic crystal substrate 12, similar to the first embodiment. As such, the direct bonding in this embodiment is performed between the low-refractive-index layer 16 and the second conductive layer 20'. In this case, a surface layer 20a' of the second conductive layer 20' may be constituted of platinum. As aforementioned, platinum is a material suitable for direct bonding. Due to this, when the surface layer 20a' of the second conductive layer 20' is constituted of platinum, the electro-optic crystal substrate 12 can suitably be bonded directly to the support substrate 14 on which the second conductive layer 20' is deposited. The deposition of the second conductive layer 20' may be performed, for example, by sputtering or vapor deposition (physical vapor deposition or chemical vapor deposition).

Figure 22:
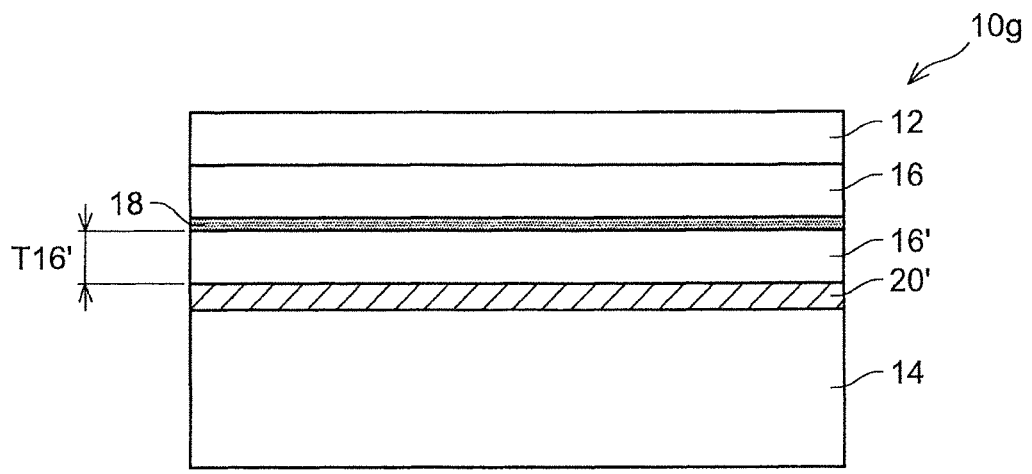
FIG. 22 schematically shows a cross-sectional structure of a composite substrate 10g of an eighth embodiment.

(Eighth Embodiment) A composite substrate 10g of an eighth embodiment will be described with reference to FIGS. 22 and 23. As shown in FIG. 22, the composite substrate 10g of the eighth embodiment further includes a second low-refractive-index layer 16' and thus differs from the composite substrate 10f of the seventh embodiment in this regard. The second low-refractive-index layer 16' has a lower refractive index than the electro-optic crystal substrate 12, similar to the low-refractive-index layer 16. The second low-refractive-index layer 16' is located between the amorphous layer 18 and the support substrate 14 and contacts the amorphous layer 18 from below. As such, the amorphous layer 18 in the present embodiment is constituted of elements constituting the low-refractive-index layer 16 and elements constituting the second low-refractive-index layer 16'. The thickness T16' of the second low-refractive-index layer 16' may be, but not particularly limited to, 0.1 micrometer or more and 10 micrometers or less, for example.

Although not particularly limited, the second low-refractive-index layer 16' may be constituted of at least one selected from the group consisting of silicon oxide ($SiO_2$), tantalum oxide ($Ta_2O_5$), aluminum oxide ($Al_2O_3$), magnesium fluoride ($MgF_2$) and calcium fluoride ($MgF_2$). The material constituting the second low-refractive-index layer 16' may be the material constituting the low-refractive-index layer 16. Alternatively, the material constituting the second low-refractive-index layer 16' may be different from the material constituting the low-refractive-index layer 16. As aforementioned, the refractive index is proportional to the square of the dielectric constant. Since the refractive index of the second low-refractive-index layer 16' is lower than the refractive index of the electro-optic crystal substrate 12, the dielectric constant of the second low-refractive-index layer 16' is lower than the dielectric constant of the electro-optic crystal substrate 12. Thus, when the composite substrate 10 has the second low-refractive-index layer 16', it becomes easy to satisfy the speed matching condition and adjust the characteristic impedance in the electro-optic elements manufactured from the composite substrate 10. Further, since the stray capacitance and dielectric loss can be reduced, the fast-speed operation and voltage reduction of the electro-optic element are enabled.

Figure 23:
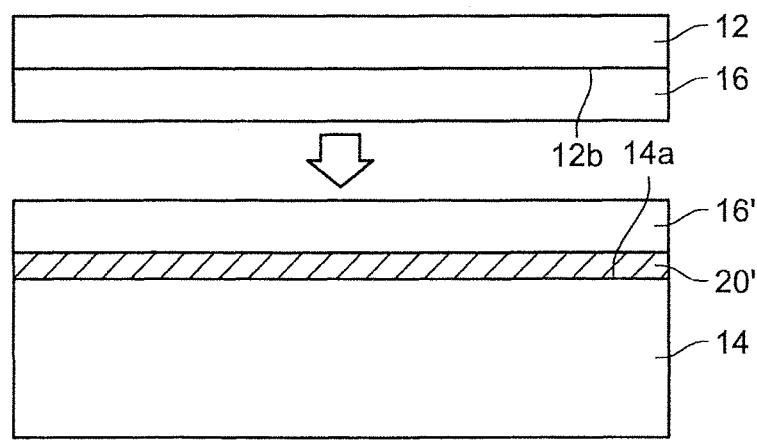
FIG. 23 shows a diagram explaining a method of manufacturing the composite substrate 10g of the eighth embodiment.

As shown in FIG. 23, the composite substrate 10g of the present embodiment can also be manufactured by directly bonding the electro-optic crystal substrate 12 to the support substrate 14. In the manufacturing method of the present embodiment, the second conductive layer 20' and the second low-refractive-index layer 16' are formed on the top surface 14a of the support substrate 14 prior to performing the direct bonding. The second conductive layer 20' is deposited on the top surface 14a of the support substrate 14, and the second low-refractive-index layer 16' is deposited on the second conductive layer 20'. The low-refractive-index layer 16 is deposited on the bottom surface 12b of the electro-optic crystal substrate 12, similar to the first embodiment. As such, the direct bonding in this embodiment is performed between the low-refractive-index layer 16 and the second low-refractive-index layer 16'. The deposition of the second low-refractive-index layer 16' may be performed by sputtering or vapor deposition (physical vapor deposition or chemical vapor deposition), similar to the low-refractive-index layer 16.

Figure 24:
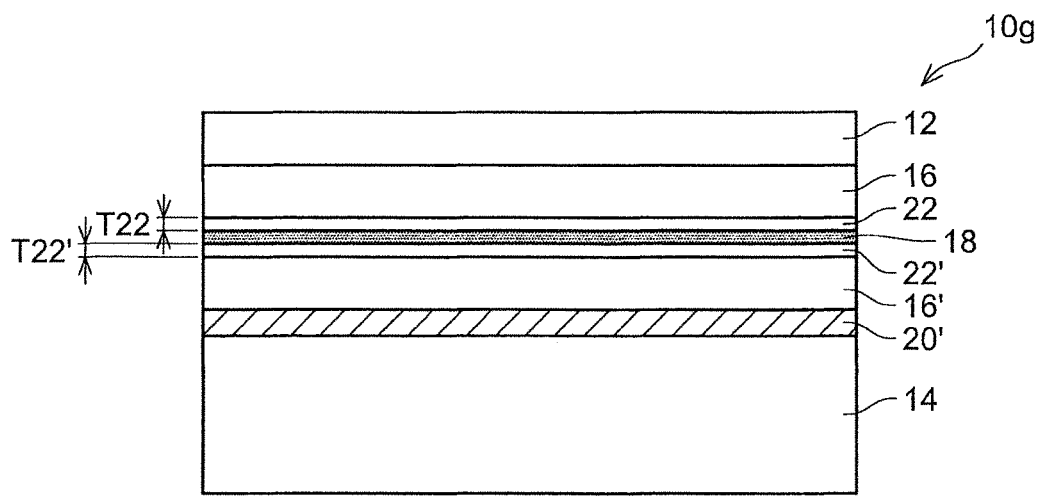
FIG. 24 schematically shows a cross-sectional structure of a composite substrate 10h of a ninth embodiment.

(Ninth Embodiment) A composite substrate 10h of a ninth embodiment will be described with reference to FIGS. 24 and 25. As shown in FIG. 24, the composite substrate 10h of the ninth embodiment further includes the first bonding layer 22 and the second bonding layer 22' and thus differs from the composite substrate 10g of the eighth embodiment in this regard. The first bonding layer 22 is located between the low-refractive-index layer 16 and the amorphous layer 18 and contacts the amorphous layer 18 from above. The second bonding layer 22' is located between the amorphous layer 18 and the second low-refractive-index layer 16' and contacts the amorphous layer 18 from below. As such, the amorphous layer 18 in the present embodiment is constituted of elements constituting the first bonding layer 22 and elements constituting the second bonding layer 22'.

As aforementioned, the first bonding layer 22 and the second bonding layer 22' can each be constituted of the material suitable for direct bonding, such as tantalum oxide ($Ta_2O_5$), niobium oxide ($Nb_2O_5$), silicon (Si), aluminum oxide ($Al_2O_3$), and titanium oxide ($TiO_2$), for example. The first bonding layer 22 and the second bonding layer 22' may be constituted of the same material or may be constituted of different materials. Thicknesses T22, T22' of the first bonding layer 22 and the second bonding layer 22' may each be, but not particularly limited to, 0.01 micrometer or more and 0.5 micrometer or less. The thicknesses T22, T22' of the first bonding layer 22 and the second bonding layer 22' may be the same or different.

Figure 25:
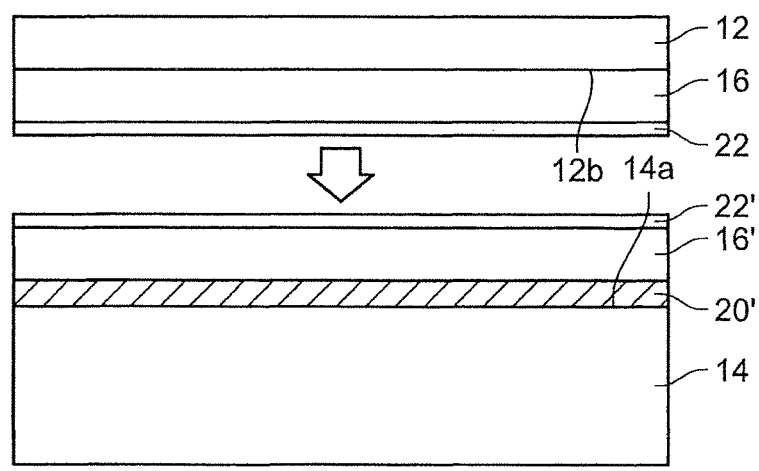
FIG. 25 shows a diagram explaining a method of manufacturing the composite substrate 10h of the ninth embodiment.

As shown in FIG. 25, the composite substrate 10h of the present embodiment can also be manufactured by directly bonding the electro-optic crystal substrate 12 to the support substrate 14. In the manufacturing method of the present embodiment, the low-refractive-index layer 16 and the first bonding layer 22 are formed on the bottom surface 12b of the electro-optic crystal substrate 12 prior to performing the direct bonding. The low-refractive-index layer 16 is deposited on the bottom surface 12b of the electro-optic crystal substrate 12 and the first bonding layer 22 is deposited on the low-refractive-index layer 16. The second conductive layer 20', the second low-refractive-index layer 16' and the second bonding layer 22' are formed on the top surface 14a of the support substrate 14. The second conductive layer 20' is deposited on the top surface 14a of the support substrate 14 and the second low-refractive-index layer 16' is deposited on the second conductive layer 20'. Then, the second bonding layer 22' is deposited on the second low-refractive-index layer 16'. As such, the direct bonding in this embodiment is performed between the first bonding layer 22 and the second bonding layer 22'. The deposition of the first bonding layer 22 and the second bonding layer 22' may be performed by sputtering or vapor deposition (physical vapor deposition or chemical vapor deposition).

Figure 26:
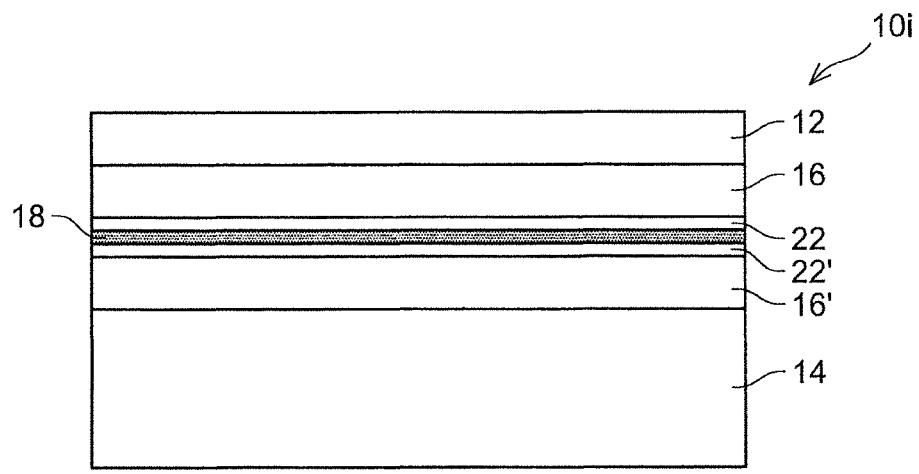
FIG. 26 schematically shows a cross-sectional structure of a composite substrate 10i of a tenth embodiment.
Figure 27:
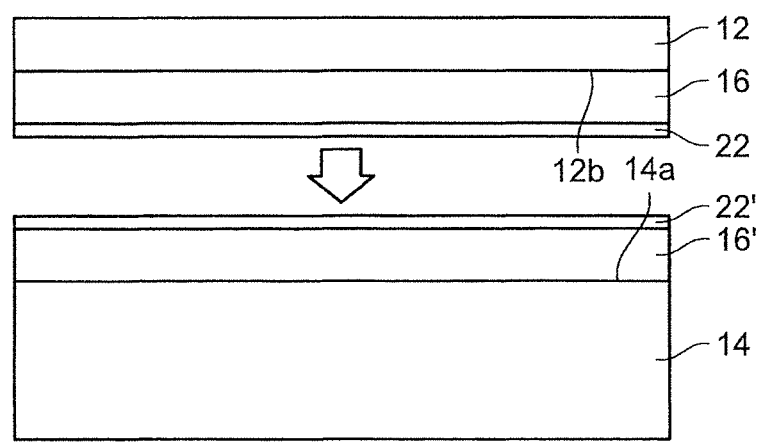
FIG. 27 shows a diagram explaining a method of manufacturing the composite substrate 10i of the tenth embodiment.

(Tenth Embodiment) A composite substrate 10i of a tenth embodiment will be described with reference to FIGS. 26 and 27. As shown in FIG. 26, the composite substrate 10i of the tenth embodiment does not include the second conductive layer 20' and thus differs from the composite substrate 10h of the ninth embodiment in this regard. That is, the second conductive layer 20' may not be necessarily required. As shown in FIG. 27, the composite substrate 10i of the present embodiment can also be manufactured by directly bonding the electro-optic crystal substrate 12 to the support substrate 14. In the manufacturing method of the present embodiment, the low-refractive-index layer 16 and the first bonding layer 22 are formed on the bottom surface 12b of the electro-optic crystal substrate 12 prior to performing the direct bonding. The low-refractive-index layer 16 is deposited on the bottom surface 12b of the electro-optic crystal substrate 12 and the first bonding layer 22 is deposited on the low-refractive-index layer 16. The second low-refractive-index layer 16' and the second bonding layer 22' are formed on the top surface 14a of the support substrate 14. The second low-refractive-index layer 16' is deposited on the top surface 14a of the support substrate 14 and the second bonding layer 22' is deposited on the second low-refractive-index layer 16'. As such, the direct bonding in this embodiment is performed between the first bonding layer 22 and the second bonding layer 22'.

Figure 28:
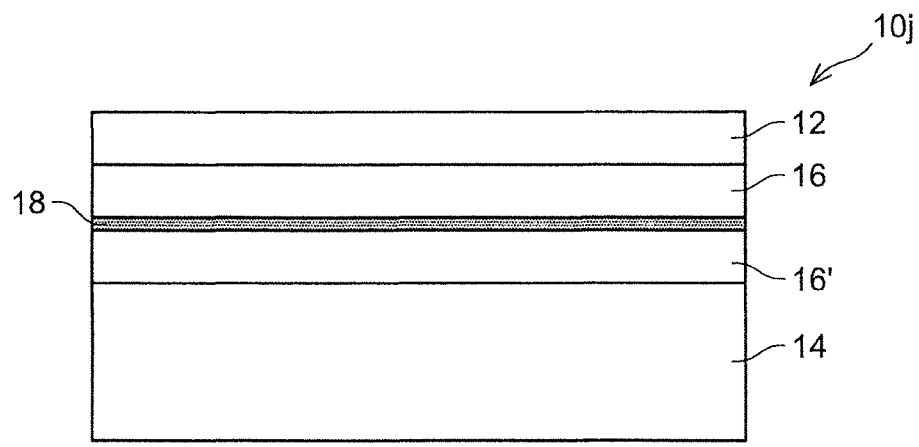
FIG. 28 schematically shows a cross-sectional structure of a composite substrate 10j of an eleventh embodiment.
Figure 29:
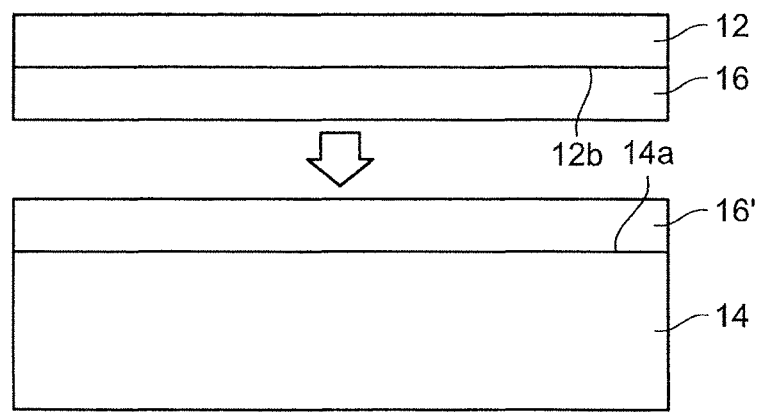
FIG. 29 shows a diagram explaining a method of manufacturing the composite substrate 10j of the eleventh embodiment.

(Eleventh Embodiment) A composite substrate 10j of an eleventh embodiment will be described with reference to FIGS. 28 and 29. As shown in FIG. 28, the composite substrate 10j of the eleventh embodiment does not include the first bonding layer 22 and the second bonding layer 22' and thus differs from the composite substrate 10i of the tenth embodiment in this regard. That is, the first bonding layer 22 and the second bonding layer 22' may not be necessarily required. As shown in FIG. 29, the composite substrate 10j of the present embodiment can also be manufactured by directly bonding the electro-optic crystal substrate 12 to the support substrate 14. In the manufacturing method of the present embodiment, the low-refractive-index layer 16 is deposited on the bottom surface 12b of the electro-optic crystal substrate 12 and the second low-refractive-index layer 16' is deposited on the top surface 14a of the support substrate 14 prior to performing the direct bonding. As such, the direct bonding in this embodiment is performed between the low-refractive-index layer 16 and the second low-refractive-index layer 16'.

REFERENCE LIST

10: Composite Substrate
12: Electro-Optic Crystal Substrate
13: Ridge Portion
14: Support Substrate
16: Low-Refractive-Index Layer
16': Second Low-Refractive-Index Layer
18: Amorphous Layer
20: First Conductive Layer
20': Second Conductive Layer
22: First Bonding Layer
22': Second Bonding Layer

The invention claimed is:

1. A composite substrate for an electro-optic element, the composite substrate comprising:
   an electro-optic crystal substrate having an electro-optic effect;
   a support substrate bonded to the electro-optic crystal substrate at least via an amorphous layer; and
   a low-refractive-index layer located between the electro-optic crystal substrate and the amorphous layer and having a lower refractive index than the electro-optical crystal substrate,
   wherein the amorphous layer contains one or more elements that are present in a layer or a substrate that contacts the amorphous layer from one side and one or more elements that are present in a layer or a substrate that contacts the amorphous layer from another side, and
   a thickness of the amorphous layer is at least 0.1 nanometer and at most 100 nanometers.

2. The composite substrate according to claim 1, wherein the low-refractive-index layer is constituted of at least one member selected from a group consisting of silicon oxide, tantalum oxide, aluminum oxide, magnesium fluoride, and calcium fluoride.

3. The composite substrate according to claim 1, wherein the support substrate is a substrate of silicon, glass, sialon, mullite, aluminum nitride, silicon nitride, magnesium oxide, sapphire, quartz, crystal, gallium nitride, silicon carbide, or gallium oxide.

4. The composite substrate according to claim 1, wherein the layer or substrate contacting the amorphous layer from the one side is the low-refractive-index layer.

5. The composite substrate according to claim 1, further comprising a first conductive layer located between the low-refractive-index layer and the amorphous layer,
   wherein the layer or substrate contacting the amorphous layer from the one side is the first conductive layer.

6. The composite substrate according to claim 5, wherein the first conductive layer comprises a layer of gold, silver, copper, aluminum, platinum, or an alloy containing at least two of gold, silver, copper, aluminum and platinum.

7. The composite substrate according to claim 1, further comprising a first bonding layer located between the low-refractive-index layer and the amorphous layer,
   wherein the layer or substrate contacting the amorphous layer from the one side is the first bonding layer.

8. The composite substrate according to claim 7, wherein the first bonding layer is constituted of at least one member selected from a group consisting of tantalum oxide, niobium oxide, silicon, aluminum oxide, and titanium oxide.

9. The composite substrate according to claim 8, further comprising a first conductive layer located between the low-refractive-index layer and the first bonding layer.

10. The composite substrate according to claim 1, wherein the layer or substrate contacting the amorphous layer from the other side is the support substrate.

11. The composite substrate according to claim 1, further comprising a second bonding layer located between the amorphous layer and the support substrate,
    wherein the layer or substrate contacting the amorphous layer from the other side is the second bonding layer.

12. The composite substrate according to claim 11 wherein the second bonding layer is constituted of at least one member selected from a group consisting of tantalum oxide, niobium oxide, silicon, aluminum oxide, and titanium oxide.

13. The composite substrate according to claim 11, further comprising a second low-refractive-index layer located between the second bonding layer and the support substrate and having a lower refractive index than the electro-optic crystal substrate.

14. The composite substrate according to claim 13, further comprising a second conductive layer located between the second low-refractive-index layer and the support substrate.

15. The composite substrate according to claim 1, further comprising a second conductive layer located between the amorphous layer and the support substrate,
    wherein the layer or substrate contacting the amorphous layer from the other side is the second conductive layer.

16. The composite substrate according to claim 15, wherein the second conductive layer is constituted of at least one member selected from a group consisting of gold, silver, copper, aluminum, and platinum.

17. The composite substrate according to claim 1, further comprising a second low-refractive-index layer located between the amorphous layer and the support substrate and having a lower refractive index than the electro-optic crystal substrate,
    wherein the layer or substrate contacting the amorphous layer from the other side is the second low-refractive-index layer.

18. The composite substrate according to claim 17, further comprising a second conductive layer located between the second low-refractive-index layer and the support substrate.

19. The composite substrate according to claim 1, wherein a ridge portion is defined on a surface of the electro-optic crystal substrate.

20. The composite substrate according to claim 19, wherein
    a c-axis of the electro-optic crystal substrate is parallel to the electro-optical crystal substrate, and
    the composite substrate further comprises a first electrode located on one side surface of the ridge portion and a second electrode located on another side surface of the ridge portion and opposing the first electrode across the ridge portion.

21. The composite substrate according to claim 19, wherein
    a c-axis of the electro-optic crystal substrate is perpendicular to the electro-optic crystal substrate, and
    the composite substrate further comprises a first electrode located on a top surface of the ridge portion and a second electrode located in a region within the surface of the electro-optic crystal substrate and excluding the ridge portion.

22. The composite substrate according to claim 19, wherein an optical waveguide region containing impurities is defined within the ridge portion along a longitudinal direction of the ridge portion.

* * * * *

UNITED STATES PATENT AND TRADEMARK OFFICE
CERTIFICATE OF CORRECTION

| | |
|---|---|
| PATENT NO. | : 11,815,751 B2 |
| APPLICATION NO. | : 18/060289 |
| DATED | : November 14, 2023 |
| INVENTOR(S) | : Tomoyoshi Tai et al. |

It is certified that error appears in the above-identified patent and that said Letters Patent is hereby corrected as shown below:

On the Title Page

Item (73):
Change "Aichi (JP)" to ---Nagoya (JP)---

Signed and Sealed this
Ninth Day of January, 2024

*Katherine Kelly Vidal*

Katherine Kelly Vidal
*Director of the United States Patent and Trademark Office*